(12) United States Patent
Omori et al.

(10) Patent No.: US 12,480,619 B2
(45) Date of Patent: Nov. 25, 2025

(54) FILLING NOZZLE

(71) Applicant: Tatsuno Corporation, Tokyo (JP)

(72) Inventors: Kento Omori, Tokyo (JP); Tatsuya Okumura, Tokyo (JP); Akihiro Matsumoto, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 0 days.

(21) Appl. No.: 18/657,318

(22) Filed: May 7, 2024

(65) Prior Publication Data
US 2024/0384839 A1 Nov. 21, 2024

(30) Foreign Application Priority Data
May 16, 2023 (JP) .................. 2023-080562

(51) Int. Cl.
*F17C 5/00* (2006.01)

(52) U.S. Cl.
CPC .......... *F17C 5/00* (2013.01); *F17C 2205/037* (2013.01); *F17C 2221/012* (2013.01); *F17C 2265/065* (2013.01); *F17C 2270/0184* (2013.01)

(58) Field of Classification Search
CPC ................ F17C 5/00; F17C 2270/0184; F17C 2265/065; F17C 2221/012; F17C 2205/037
See application file for complete search history.

(56) References Cited

U.S. PATENT DOCUMENTS 11,193,631 B2 * 12/2021 Takezawa ............... F17C 5/007

FOREIGN PATENT DOCUMENTS

| EP | 0039977 A1 * | 11/1981 | ............. F16L 35/00 |
| JP | 6516207 B2 | 5/2019 | |
| WO | WO-9747557 A1 * | 12/1997 | ............. F17C 13/04 |

* cited by examiner

*Primary Examiner* — Timothy L Maust
(74) *Attorney, Agent, or Firm* — Stetina Garred Brucker & Newboles

(57) ABSTRACT

A filling nozzle includes a pipe joint body provided at a tip of a filling hose and connected to a receptacle on a side to be filled; a clutch that extends on an outside of the pipe joint body in a connection direction in which the pipe joint body and the receptacle are connected and engages with the receptacle; a lever that extends on an outside of the clutch in the connection direction and restricts a movement of the clutch in the connection direction when the gaseous fuel is filled; and an urging means urging the clutch inward in a direction perpendicular to the connection direction to release the restriction in movement of the clutch in the connection direction when filling of the gaseous fuel is completed.

9 Claims, 9 Drawing Sheets

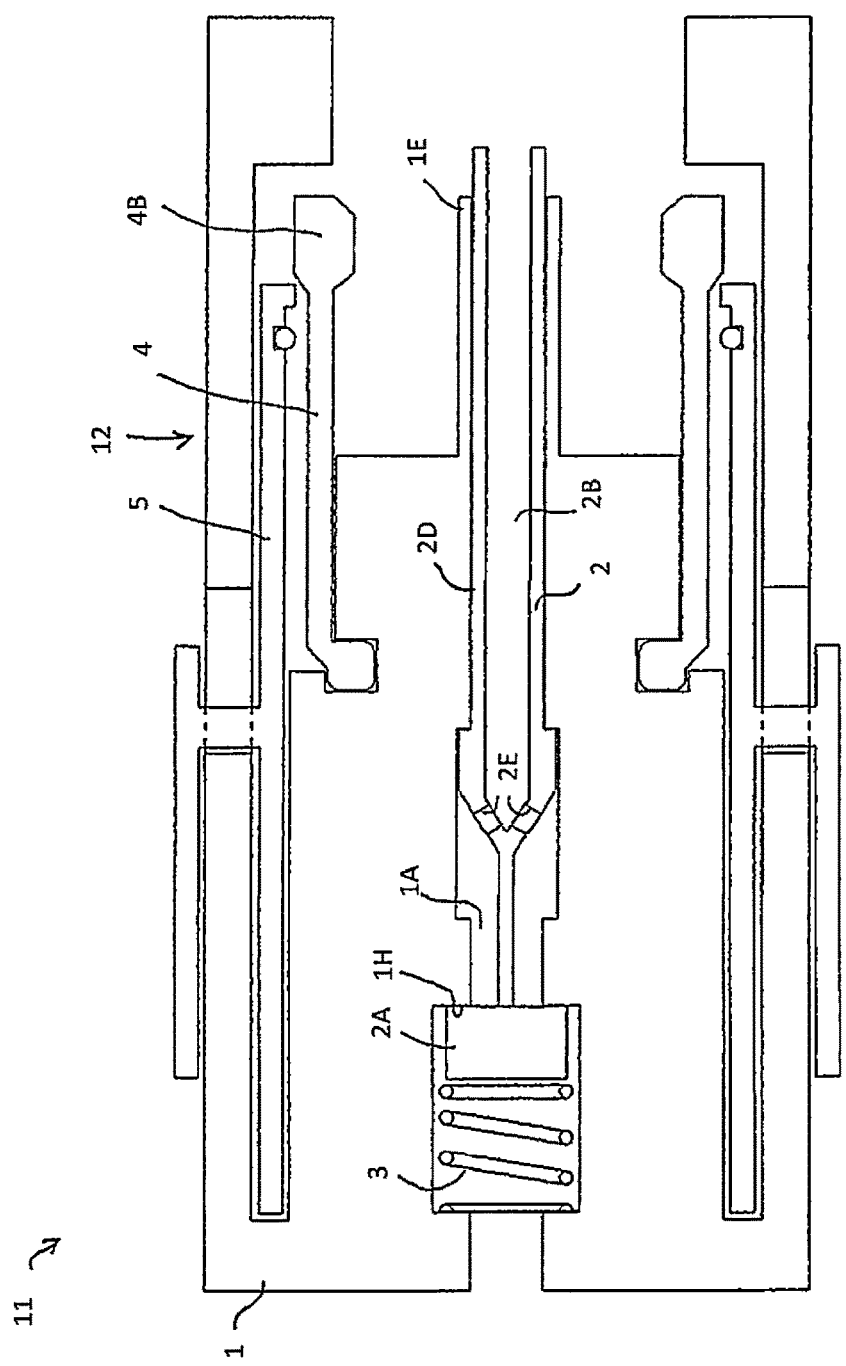
[Fig.1]

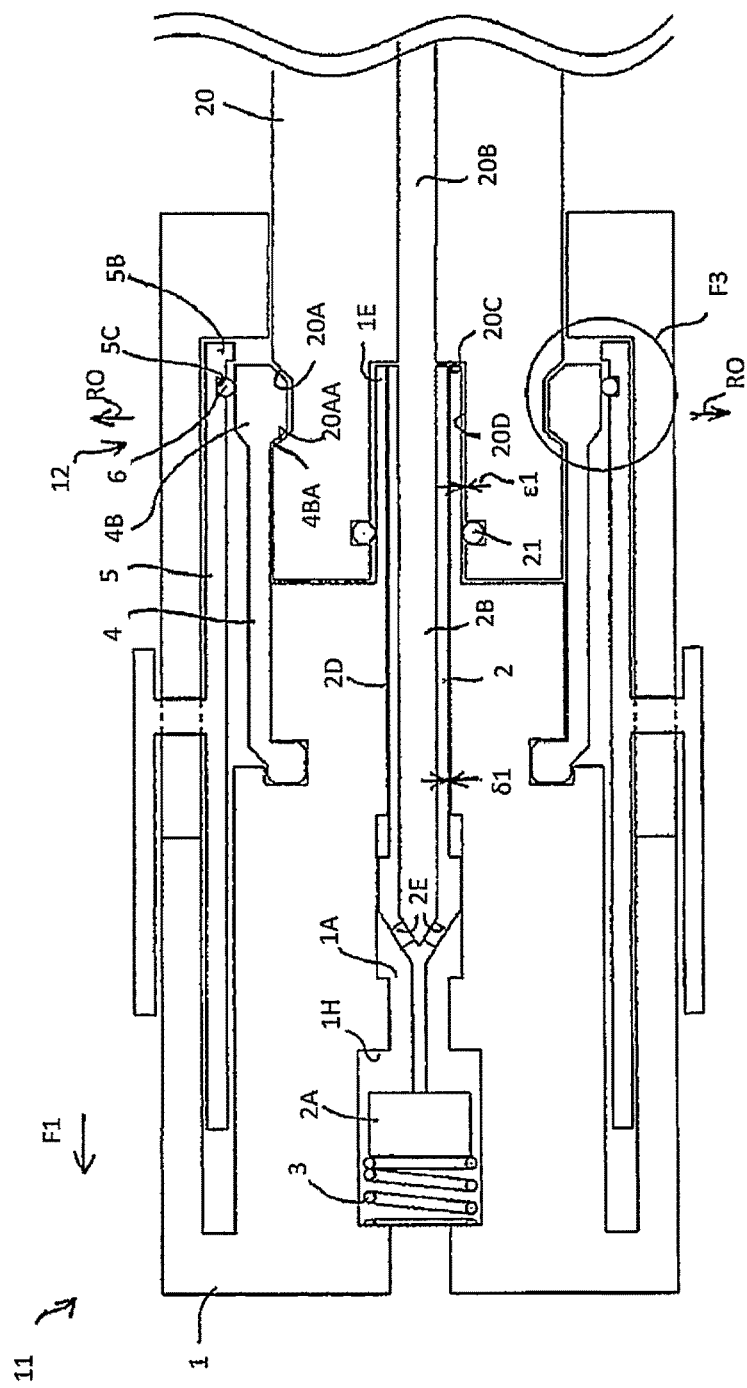
[Fig.2]

[Fig. 3]
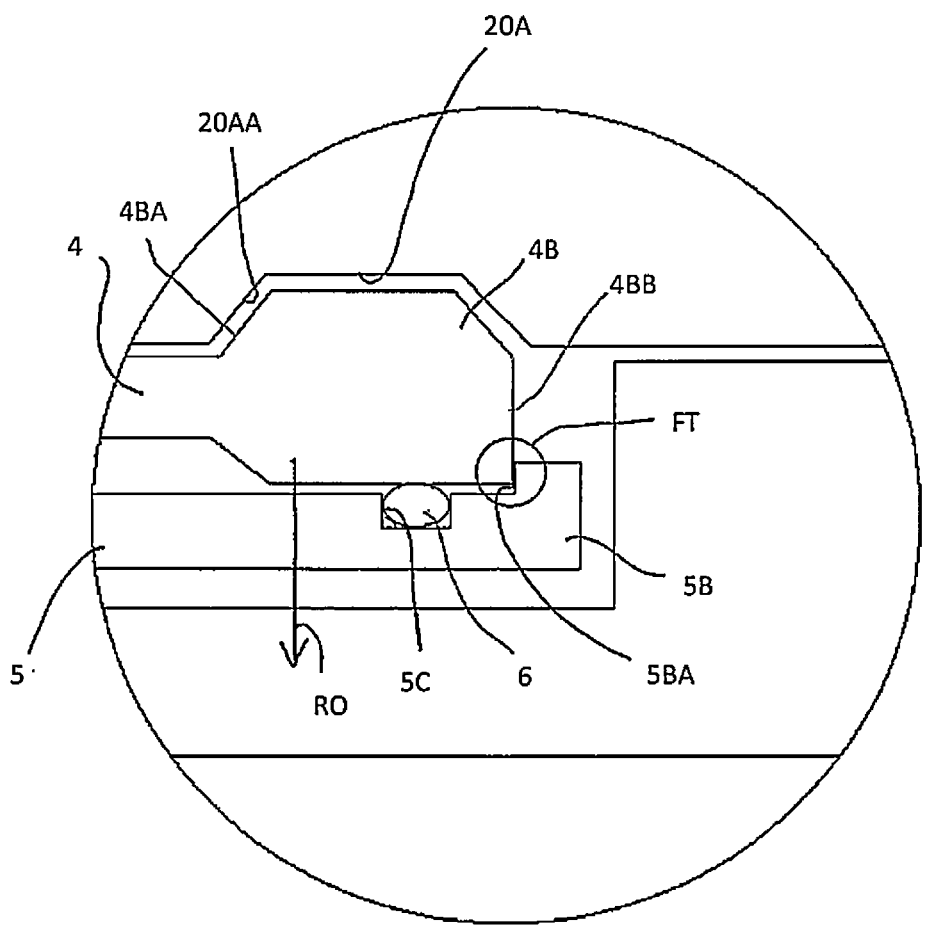

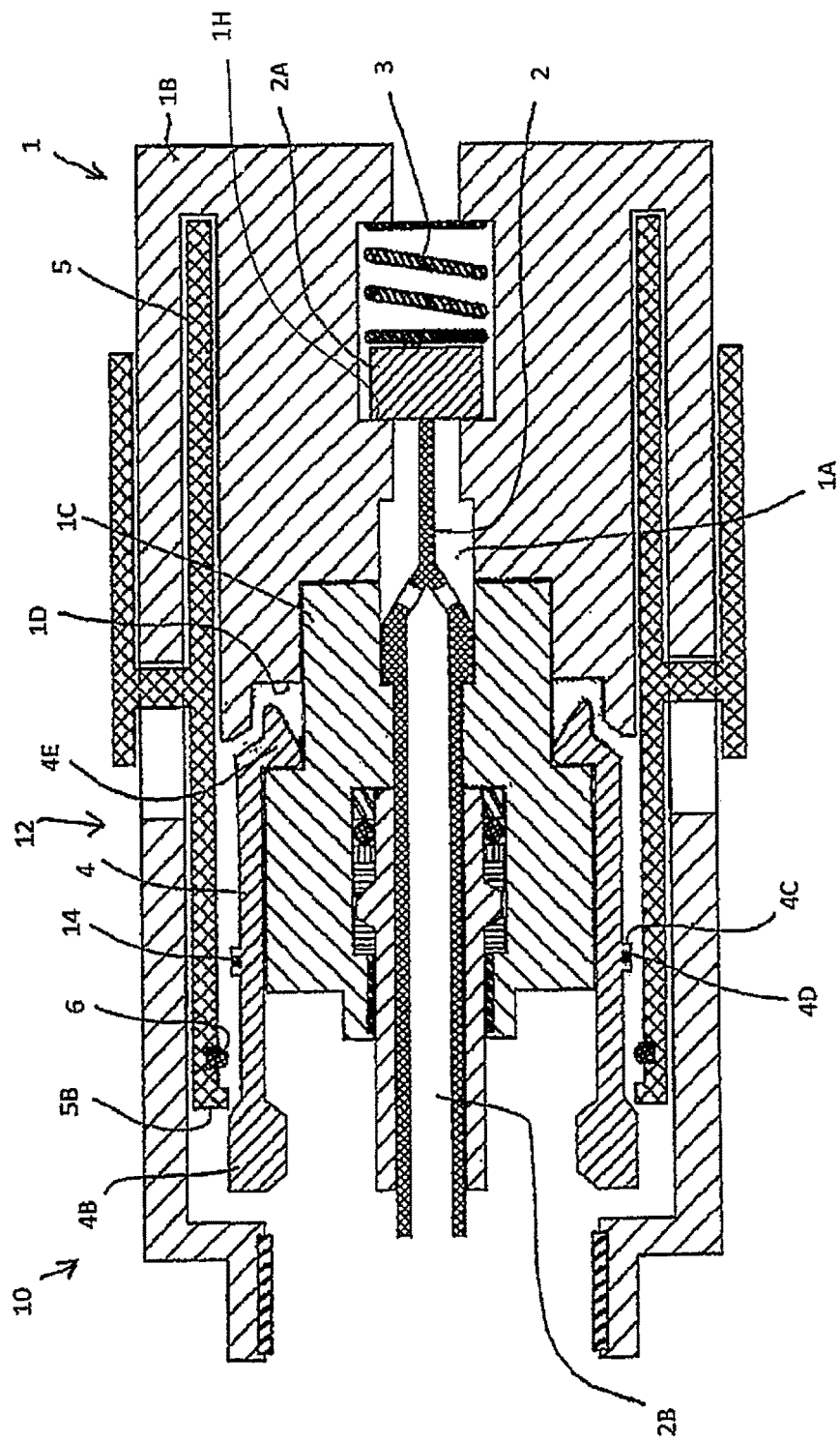
[Fig.4]

[Fig. 5]
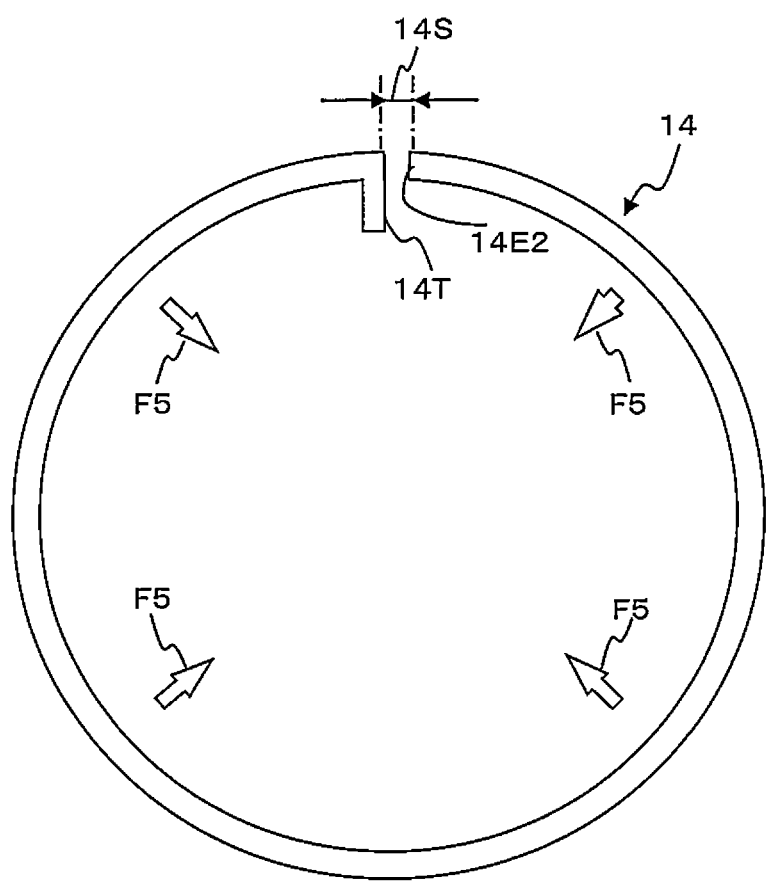

[Fig. 6]
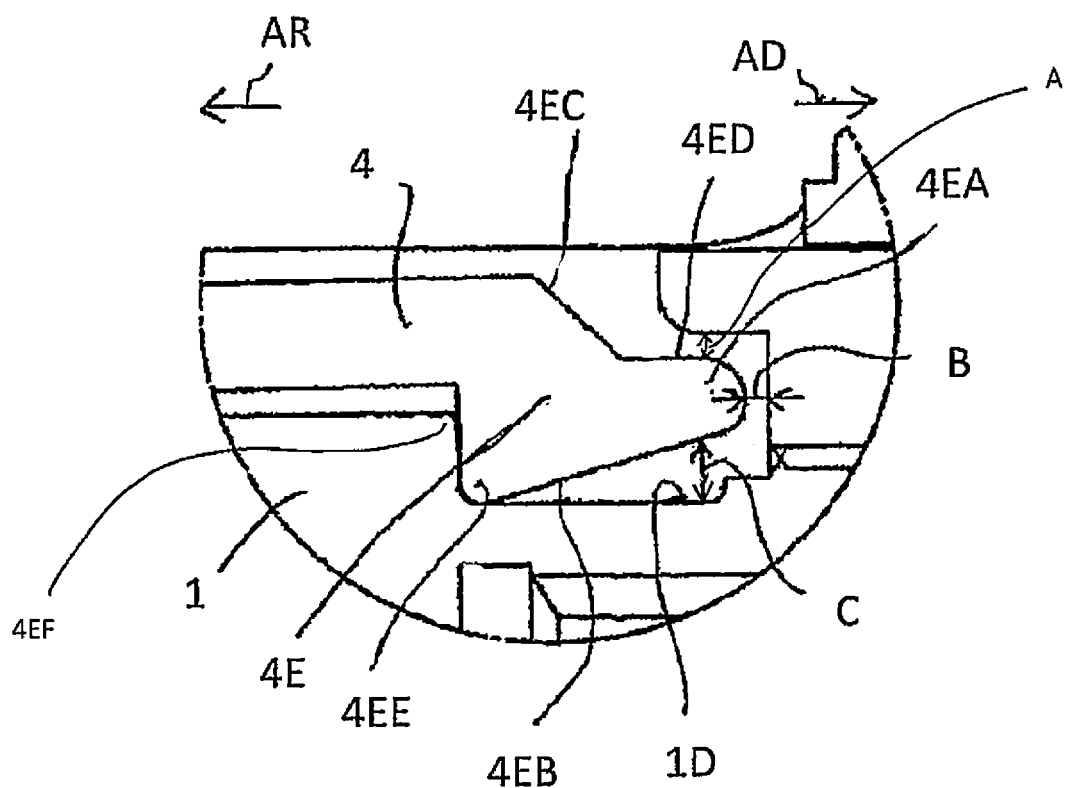

[Fig. 7]
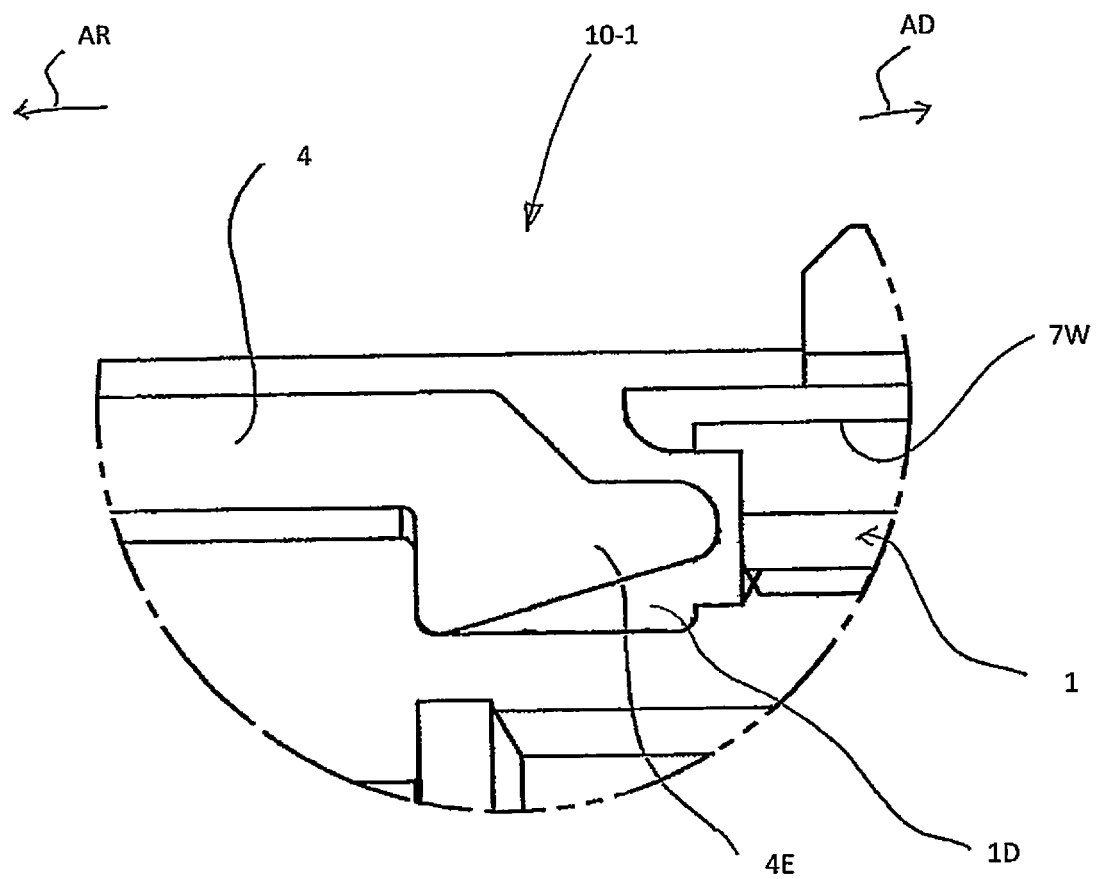

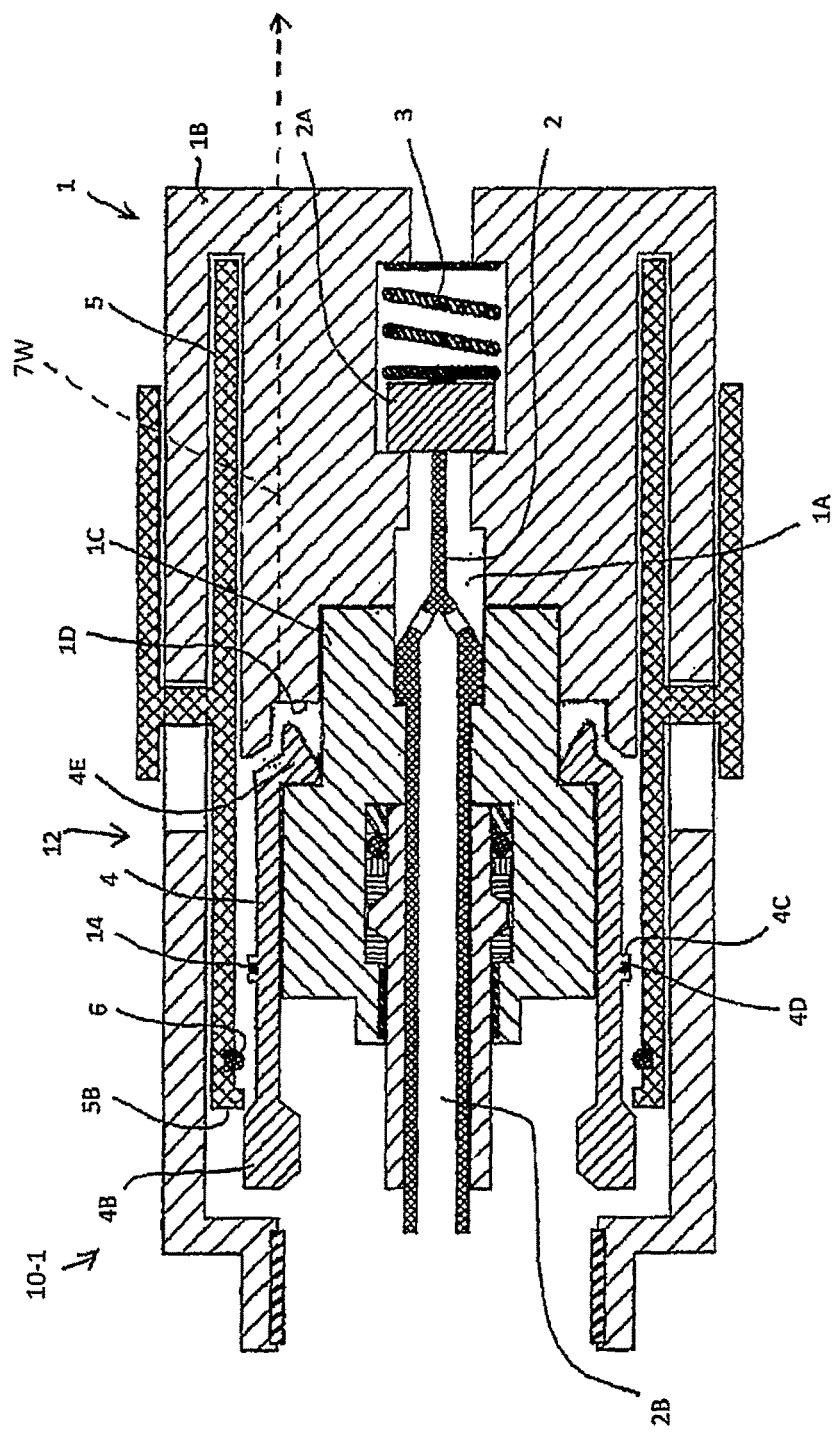
[Fig.8]

[Fig. 9]
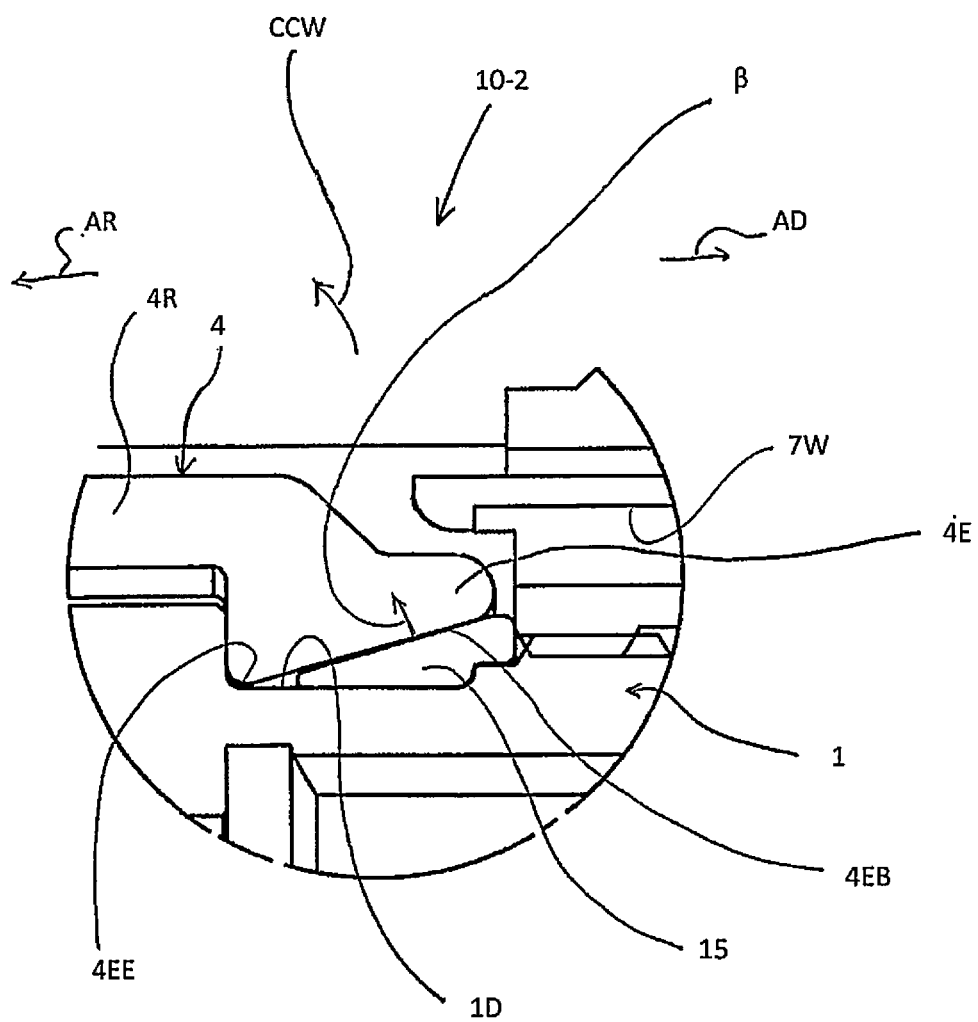

FILLING NOZZLE

CROSS-REFERENCE TO RELATED APPLICATIONS

The present application claims priority to Japanese Patent Application No. 2023-080562 filed on May 16, 2023, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a filling nozzle for filling gaseous fuel such as hydrogen gas.

2. Description of the Related Art

Regarding a filling nozzle for filling gaseous fuel, in order to prevent deterioration of seal structures and reduce the possibility of hydrogen gas leakage, the applicant proposed a technique disclosed in JP-B-6516207. Although this technique is useful, in a state where a filling nozzle and a receptacle are connected, a protrusion formed at a tip of a clutch of the filling nozzle becomes unable to move radially inward due to freezing or the like, and if the filling nozzle is fixed in a radially outwardly open state, there is a problem in that the filling nozzle cannot be removed from the receptacle.

The content of JP-B-6516207 gazette is incorporated herein by reference in its entirety.

BRIEF SUMMARY

The present invention has been proposed in view of the problems of the prior art described above, and an object thereof is to provide a filling nozzle that can be disconnected from a receptacle even if a clutch becomes difficult to disengage.

A filling nozzle 10 according to the present invention is characterized by including: a pipe joint body 1 provided at a tip of a filling hose for filling gaseous fuel and connected to a receptacle 20 on a side to be filled with gaseous fuel; a clutch 4 that extends on an outside of the pipe joint body 1 in a direction in which the pipe joint body 1 and the receptacle 20 are connected (hereinafter referred to as "connection direction") and engages with the receptacle 20; a lever 5 that extends on an outside of the clutch 4 in the connection direction and restricts a movement of the clutch 4 in the connection direction when the gaseous fuel is filled; and an urging means interposed between the lever 5 and the clutch 4 or between the pipe joint body 1 and the clutch 4, the urging means urging the clutch 4 inward in a direction perpendicular to the connection direction to release the restriction in movement of the clutch 4 in the connection direction when filling of the gaseous fuel is completed.

Here, the urging means may be an elastic body 14 such as a spring disposed between the lever 5 and the clutch 4.

In addition, the urging means can be a ring-shaped elastic spacer 15 disposed at an engaging portion 4EE where an end 4E, remote from the receptacle 20, of the clutch 4 engages with the pipe joint body 1, and a shape of the elastic spacer 15 is complementary to a region of the engaging portion 4EE inward in a direction perpendicular to the connection direction.

Further, an annular recess 1D for accommodating the end, remote from the receptacle 20, of the clutch 4 may be formed in the pipe joint body 1, and a drainage channel 7W can be provided for communicating the annular recess 1D with an outside of the pipe joint body 1.

According to the filling nozzle of the present invention having the above-described configuration, since the filling nozzle 10 includes the urging means for releasing the restriction in movement of the clutch 4 in the connection direction when gaseous fuel filling is completed, even if it becomes difficult for the clutch 4 to be disengaged for some reason, the filling nozzle 10 can be disconnected from the receptacle 20.

Here, for example, when moisture contained in the air that has entered the filling nozzle 10 is cooled by a low temperature hydrogen gas, it freezes and connects the clutch 4 and the nozzle parts around it, or the elastic body 14 such as a spring and the nozzle parts of the clutch 4 on an outer side in the connection direction may be coupled together. When a water accumulated in an annular recess 1D of the pipe joint body 1 freezes, the clutch 4 cannot be removed from the receptacle 20, and the filling nozzle 10 cannot be disconnected from the receptacle 20.

However, in the present invention, if the drainage channel 7W is provided that communicates the annular recess (groove) 1D that accommodates the end 4E of the clutch 4 formed in the pipe joint body 1 with an outside of the pipe joint body 1, even if a water accumulates in the recess 1D, it is discharged to the outside of the filling nozzles 10-1 and 10-2 via the drainage channel 7W, so that freezing of the annular recess 1D can be prevented. Therefore, the inward movement of the clutch 4 in the direction perpendicular to the connection direction is not hindered, and the clutch 4 is disengaged from the receptacle 20, and the filling nozzles 10-1 and 10-2 can be disconnected from the receptacle 20.

Further, the urging means is the ring-shaped elastic spacer 15 disposed in the engagement portion 4EE whose end portion of the clutch 4 on the side away from the receptacle 20 is engaged with the pipe joint body 1, and making the shape of the engagement portion 4EE complementary to the inner region in the direction perpendicular to the connection direction, water and foreign matter do not enter the region. Further, the end portion 4E of the clutch 4 is in contact with the pipe joint body 1 at the engaging portion 4EE. Therefore, the elastic repulsive force R acting outward in the direction perpendicular to the connection direction of the elastic spacer 15 acts as a rotational force CCW with the engagement portion 4EE as a rotation center. This rotational force CCW urges the clutch 4 other than the end 4E inward in the radial direction, so that the clutch 4 is disengaged from the receptacle 20 and the filling nozzle 10-2 is disconnected from the receptacle 20.

BRIEF DESCRIPTION OF THE DRAWINGS

FIG. 1 is a sectional view showing a pipe joint body of a conventional filling nozzle.

FIG. 2 is a sectional view showing a state in which the pipe joint shown in FIG. 1 is coupled to a receptacle.

FIG. 3 is an enlarged view of a portion F3 in FIG. 2.

FIG. 4 is a sectional view showing a filling nozzle according to the first embodiment of the present invention.

FIG. 5 is an explanatory view showing a spring of the filling nozzle shown in FIG. 4.

FIG. 6 is an enlarged view showing an engagement portion between a clutch and a pipe joint of the filling nozzle shown in FIG. 4, with no elastic spacer fitted.

FIG. 7 is a partially enlarged sectional view showing essential parts of a filling nozzle according to the second embodiment of the present invention.

FIG. 8 is a cross-sectional view schematically showing a drainage channel of the filling nozzle shown in FIG. 7.

FIG. 9 is a partially enlarged sectional view showing essential parts of the filling nozzle shown in FIG. 7.

DETAILED DESCRIPTION

Embodiments of the present invention will be described below with reference to the accompanying drawings. First, in order to understand the present invention, the prior art described in JP-B-6516207 will be explained with reference to FIGS. 1 to 3.

In FIGS. 1 and 2, a filling nozzle 11 is provided, for example, at a tip of a filling hose of a fuel filling system that fills hydrogen into a hydrogen filling tank of an FCV, and has a pipe fitting body 1, which is connected to a receptacle 20 at filling. A pipe joint flow path 1A is formed inside the pipe joint body 1, a rod 2 is slidably disposed in the pipe joint flow path 1A, and a valve seat 1H is formed. A valve body 2A is provided at an end of the rod 2, and is seated on the valve seat 1H. An elastic member 3 that urges the valve body 2A toward the valve seat 1H is disposed in the pipe joint flow path 1A.

As shown in FIG. 2, when the pipe fitting body 1 and the receptacle 20 are connected, a hydrogen gas flows through the pipe fitting internal flow path 1A, the rod internal flow path 2B, or flows through a gap 61 between an outer circumferential surface of a rod large diameter portion 2D and an inner peripheral surface of the joint internal flow path 1A, reaches a bottom 20C of a receptacle fitting recess, and flows through the receptacle internal flow path 20B. Even if there is a hydrogen gas flowing from the bottom 20C of the receptacle fitting recess through the gap F1 between an inner wall surface 20D of the receptacle fitting recess and an outer peripheral surface of the pipe joint central projection 1E, the hydrogen gas is sealed by an O-ring 21 provided on the inner peripheral surface 20D.

In FIG. 2, a clutch mechanism 12 has a function of holding a receptacle side end of the lever 5 at a position radially outward of the clutch 4 and preventing a protrusion 4B of the clutch 4 from coming off from a fitting groove 20A of the receptacle 20. The clutch mechanism 12 includes a protrusion 5B provided at the end of the lever 5 on the receptacle side (right side in FIGS. 1 and 2) so as to protrude radially inward, and a ring-shaped elastic member 6 (for example, an O-ring) provided on a side (left side in FIGS. 1 and 2) farther from the receptacle 20 than the protrusion 5B of the lever. The ring-shaped elastic member 6 fits into an elastic body groove 5C formed near the receptacle side end of the lever 5.

As shown in FIG. 2, when the pipe fitting body 1 and the receptacle 20 are connected, the valve body 2A at a tip of the rod 2 is separated from the valve seat 1H, and a hydrogen gas flows into the pipe fitting internal flow path 1A, and flows through the rod internal flow path 2B and the receptacle internal flow path 20B. At this time, the hydrogen gas is at a very high pressure (for example, 70 MPa), and this pressure causes a tensile force F1 (FIG. 2) that tries to peel off the pipe joint body 1 from the receptacle 20. As a result of the tensile force F1 acting on the pipe joint body 1, a slope 4BA of the protrusion 4B of the clutch 4 on the side away from the receptacle 20 (the left side in FIG. 2) and a slope 20AA of the receptacle fitting groove 20A away from the receptacle 20 cause radially outward force RO, as a component of the tensile force F1, to act on the clutch 4, and this force RO moves the clutch 4 radially outward.

As shown in FIG. 3, which is an enlarged view of a portion F3 in FIG. 2, when the clutch 4 moves radially outward due to the radially outward force RO, the ring-shaped elastic body 6 becomes collapsed in the radial direction. As a result, the end surface 4BB of the protrusion 4B of the clutch 4 and the end surface 5BA of the protrusion 5B of the lever 5 are joined in a region FT. As a result, the lever 5 cannot move away from the receptacle 20 from the state shown in FIG. 3 (leftward in FIGS. 2 and 3). Since the lever 5 does not move, the lever 5 continues to be located radially outward of the protrusion 4B of the clutch 4, and prevents the clutch 4 from moving radially outward. Therefore, the protrusion 4B of the clutch 4 does not come off the fitting groove 20A of the receptacle 20, and the connection between the pipe joint body 1 and the receptacle 20 is prevented from being disconnected.

In FIGS. 2 and 3, when filling with hydrogen gas is completed and predetermined depressurization work is completed, the tensile force F1 due to the high pressure of hydrogen gas disappears. Along with this, the radially outward force RO acting on the clutch 4 also disappears, the clutch 4 returns to the radially inward position (the position before hydrogen gas filling), and the ring-shaped elastic member 6 returns to the state with a circular cross section from the collapsed state shown in FIG. 3. Therefore, the end surface 4BB and the end surface 5BA have different relative positions in the radial direction (vertical positions in FIG. 3), and are not in a state like the region FT in FIG. 3. Therefore, unlike the state shown in FIG. 3, the lever 5 is movable in the direction away from the receptacle 20 (leftward in FIGS. 2 and 3). If the lever 5 is moved in the direction away from the receptacle 20 (to the left in FIGS. 2 and 3), the lever 5 will not be located radially outward of the clutch 4, and the protrusion 4B can deviate from the fitting groove 20A of the receptacle 20. Then, the connection between the pipe joint body 1 and the receptacle 20 can be released.

The invention described in JP-B-6516207 with reference to FIGS. 1 to 3 is a useful technique. However, if for some reason the connection between the end surface 4BB of the protrusion 4B of the clutch 4 and the end surface 5BA of the protrusion 5B of the lever 5 is not released, even if the hydrogen filling is completed and the radially outward force RO disappears, the end surface 4BB and the end surface 5BA are not separated, and the lever 5 cannot be moved in the direction away from the receptacle 20. In that case, the protrusion 4B of the clutch 4 cannot be removed from the fitting groove 20A of the receptacle 20, and the nozzle 11 cannot be removed from the receptacle 20.

In contrast, in the filling nozzle 10 of the first embodiment shown in FIG. 4, the nozzle 11 can be reliably removed from the receptacle 20 once hydrogen filling is completed and the radially outward force RO disappears. In FIG. 4, a spring (elastic body) 14 is disposed at or near the center of the clutch 4 in the longitudinal direction of the nozzle, and the spring 14 urges the clutch 4 inward in the radial direction of the nozzle 10. The structure of the portion where the clutch base portion 4E engages with the distal end portion 1C of the pipe joint body 1 is different in the first embodiment shown in FIG. 4 from that in FIGS. 1 to 3. Although the receptacle 20 is not shown in FIG. 4, the structure on the receptacle side is the same as in FIGS. 1 to 3. In FIG. 4, the left side is the receptacle side. When explaining with reference to FIG. 4, parts similar to those in FIGS. 1 to 3 are given the same reference numerals as in FIGS. 1 to 3, and redundant explanation will not be given. In the following, points different from those in FIGS. 1 to 3 will be mainly explained.

In FIG. 4, a convex portion 4C is formed near the center of the clutch 4 in the longitudinal direction of the filling nozzle. A groove 4D is formed radially outward of the convex portion 4C. The spring 14, which is an elastic body, is arranged in the groove 4D. When the spring 14 is disposed in the groove 4D (see FIG. 4), it contracts radially inward due to elastic repulsive force, as shown in FIG. 5, for example. This contraction force acts from the spring 14 on the bottom of the groove 4D, and acts in the direction indicated by an arrow F5. The clutch 4 is urged inward in the radial direction of the nozzle 10 by an elastic repulsive force (the arrow F5) by the spring 14.

In FIG. 5, a locking portion 14T that protrudes inward in the radial direction of the clutch 4 is provided at an end of the spring 14, and a hole (not shown) is formed at the bottom of the groove 4D. By locking the locking portion 14T in the hole at the bottom of the groove 4D, the spring 14 can be prevented from rotating in the circumferential direction. Further, a gap 14S is formed between the end where the locking portion 14T is provided and the other end 14E2, so that even if the spring 14 is urged inward in the radial direction by an unexpected external force, the damage is prevented by the gap 14S. Although not shown, the spring 14 may be a tension coil spring connected in an annular shape.

As shown in FIG. 4, the pipe fitting body 1 includes a pipe fitting body base 1B and a pipe fitting body tip 1C, and a clutch base 4E (dispenser side end of the clutch 4: right end in FIG. 4) engages with the pipe fitting body tip 1C at a concave portion 1D. Details of the engagement portion between the annular recess 1D of the pipe joint body 1 and the clutch base 4E are shown in FIG. 6. In FIG. 6, the receptacle side is indicated by an arrow AR, and the dispenser side is indicated by an arrow AD. The dispenser side end 4E of the clutch 4 is offset radially inward (downward in FIG. 6) compared to other parts of the clutch 4. In the dispenser side end 4E of the clutch 4, the portion on the receptacle side (left side in FIG. 6) is an engaging portion 4EE, and the engaging portion 4EE is engaged with the pipe joint body 1. Further, an endmost portion 4EA located closest to the dispenser (rightmost in FIG. 6) is located radially outward (upper in FIG. 6) compared to the engaging portion 4EE. In the dispenser side end 4E, a radially inner end surface 4EB forms an inclined surface facing radially outward (upward in FIG. 6) toward the dispenser side AD. A radially outer end surface of the dispenser side end 4E of the clutch 4 has an inclined surface 4EC and a flat surface 4ED.

In FIG. 6, at the dispenser side end 4E, the flat surface 4ED of the radially outer end surface is movable by the length shown by an arrow A, the outermost end 4EA is movable by the length shown by an arrow B, and the radially inner end surface 4EB is movable by a length indicated by an arrow C with respect to the pipe joint body 1. As described above with reference to FIGS. 4 and 5, the clutch 4 is radially inwardly biased by the elastic repulsive force of the spring 14 disposed in the groove 4D formed at or near the longitudinal center of the nozzle of the clutch 4. The clutch 4 to which the elastic repulsive force acts is not supported anywhere on the receptacle side (the arrow AR side in FIG. 6), and the end 4E on the dispenser side can move by the lengths shown by the arrows A, B, and C as described above. Therefore, at the engagement point (recess 1D: see FIG. 4) where the dispenser side end 4E of the clutch 4 is engaged with the pipe joint body tip 1C, urging the clutch 4 inward in the radial direction of the nozzle 10 by the elastic repulsive force of the spring 14 is not impeded.

In the filling nozzle 10 of the first embodiment shown in FIGS. 4 and 5, for some reason, even if the end surface 4BB of the protrusion 4B of the clutch 4 (see FIGS. 2 and 3) and the end surface 5BA of the protrusion 5B of the lever 5 (see FIGS. 2 and 3) becomes difficult to release, the elastic repulsive force of the spring 14 urges and presses the clutch 4 inward in the radial direction. When hydrogen filling is completed and the radially outward force RO (FIGS. 2 and 3) disappears, the tip of the clutch 4 moves radially inward due to the elastic repulsive force of the spring 14, and the coupling between the end surface 4BB of the protrusion 4B of the clutch 4 and the end surface 5BA of the protrusion 5B of the lever 5 is released, and the lever 5 can be moved in a direction away from the receptacle 20 (leftward in FIGS. 2 and 3). As a result, the protrusion 4B of the clutch 4 can be removed from the fitting groove 20A of the receptacle 20, and the filling nozzle 10 can be disconnected from the receptacle 20. In addition, in the first embodiment shown in FIGS. 4 and 5, the configuration in which the dispenser side end 4E of the clutch 4 engages with the tip end 1C of the pipe joint body 1 is not limited to that shown in FIG. 6. For example, it is also possible to adopt the configuration shown in FIGS. 1 and 2 (the configuration described in JP-B-6516207 gazette).

In the first embodiment shown in FIGS. 4 and 5, for example, when moisture contained in the air that has entered the filling nozzle 10 is cooled by low temperature hydrogen gas, it freezes and connects the clutch 4 and its surrounding nozzle parts. For example, when the pipe joint body 1 of the filling nozzle 10 is connected to the receptacle 20, if the water accumulated in the annular groove 1D (the recessed part where the dispenser side end 4E of the clutch 4 engages) freezes, the elastic repulsive force of the spring 14 makes it impossible for the clutch 4 to move inward in the radial direction, and the protrusion 4B of the clutch 4 does not come off the fitting groove 20A (FIGS. 2 and 3) of the receptacle 20, thereby connecting the filling nozzle 10 from the receptacle 20 will no longer be possible to release it. In the first embodiment shown in FIGS. 4 and 5, it is difficult to prevent such inconveniences caused by freezing.

This disadvantage is overcome by the second embodiment of the present invention. The second embodiment will be described with reference to FIGS. 7 and 8. In FIGS. 7 and 8, the filling nozzle according to the second embodiment is generally designated by the reference numeral 10-1. In FIG. 7, a drainage channel 7W communicates with the annular recess 1D formed in the pipe joint body 1 and engaged with the dispenser side end 4E of the clutch 4. As shown by a dotted line in FIG. 8, the drainage channel 7W passes through the pipe joint body 1, and although it is not clearly shown, the drainage channel 7W is configured to communicate with a drainage port (not shown) provided at a boundary between a grip of the filling nozzle 10-1 and a filling hose to drain from the boundary to the outside of the filling nozzle 10-1. It is also possible to form the drainage port at a location other than the boundary between the grip of the filling nozzle 10-1 and the filling hose.

In the second embodiment shown in FIGS. 7 and 8, even if water accumulates in the annular recess 1D, the accumulated water is discharged to the outside of the filling nozzle 10-1 via the drainage channel 7W, and freezing is prevented. Therefore, the clutch 4 moves radially inward due to the elastic repulsive force of the spring 14, making it possible to move the lever 5 in the direction away from the receptacle 20 (leftward in FIGS. 2 and 3), and the protrusion 4B of the clutch 4 comes off from the fitting groove 20A (FIGS. 2 and 3) of the receptacle 20, and the filling nozzle 10 can be disconnected from the receptacle 20. The other configurations and effects of the second embodiment shown in FIGS. 7 and 8 are the same as those of the first embodiment shown in FIGS. 4 to 6.

Next, the third embodiment of the present invention will be described with reference to FIG. 9. The filling nozzle according to the third embodiment is generally designated by the reference numeral 10-2. In FIG. 9, an elastic spacer 15 abuts against the engagement portion where the dispenser side end 4E of the clutch 4 (the end remote from the receptacle 20, the right end in FIG. 6) is engaged with the pipe joint body 1. The elastic repulsive force of the elastic spacer 15 acts on the end 4E of the clutch 4, as shown by an arrow 3. The shape of the elastic spacer 15 is approximately complementary to the radially inner region of the gap of the recess 1D (the lower region of the recess 1D in FIG. 9), and is located in that region. If the elastic spacer 15 is located in a region radially inward (downward in FIG. 9) from the radially inner end surface 4EB of the dispenser side end 4E of the recess 1D, no water or foreign matter will be present in the region. Further, in the third embodiment shown in FIG. 9, the drainage channel 7W communicates with the annular recess 1D similarly to the second embodiment. Therefore, even if water accumulates outside the elastic spacer 15 in the radial direction (above in FIG. 9), it is discharged to the outside of the filling nozzle 10-1 via the drainage channel 7W.

Here, the end portion 4E of the clutch 4 is in contact with the pipe joint body 1 at the engaging portion 4EE at the filling nozzle side (arrow AR side: left side in FIG. 9) end of the recess 1D. Therefore, the elastic repulsive force R acting radially outward (upward in FIG. 9) acts as a rotational force indicated by the arrow CCW with the engagement portion 4EE as the rotation center. It is also possible to generate a rotational force with a corner indicated by a reference numeral 4EF in FIG. 6 as a rotation center. The rotational force acting in the direction indicated by the arrow CCW becomes a force that moves the receptacle side portion 4R of the clutch 4 (the portion other than the dispenser side end 4E of the clutch 4) radially inward. This force causes the clutch 4 to move radially inward, the protrusion 4B of the clutch 4 disengaging from the fitting groove 20A (FIGS. 2 and 3) of the receptacle 20, and the filling nozzle 10 being disconnected from the receptacle 20. That is, the elastic spacer 15 is configured to urge the clutch 4 inward in the radial direction of the fuel nozzle 10-2. In the third embodiment, the spring 14 is omitted because the elastic spacer 15 generates a force that moves the receptacle side portion 4R of the clutch 4 (portion other than the dispenser side end 4E of the clutch 4) inward in the radial direction. It is also possible to provide a spring 14 and urge the clutch 4 inward in the radial direction by both the elastic repulsive force of the elastic body spacer 15 and the elastic repulsive force of the spring 14.

According to the third embodiment shown in FIG. 9, the effect of the elastic spacer 15 and the drainage channel 7W makes it difficult for the annular recess 1D to freeze. Then, the elastic repulsive force of the elastic spacer 15 urges the clutch 4 inward in the radial direction, so that the lever 5 can be moved in the direction away from the receptacle 20 (to the left in FIGS. 2 and 3), and the projection 4B of the clutch 4 comes off from the fitting groove 20A of the receptacle 20, and the filling nozzle 10 can be reliably disconnected from the receptacle 20. Other configurations and effects of the third embodiment shown in FIG. 9 are similar to those of the embodiment shown in FIGS. 4 to 8.

In the illustrated embodiments, the material of the elastic spacer 15 is preferably closed foam rubber. An open cell structure is not suitable as a material for forming the elastic spacer 15 because there is a risk of water infiltration. However, if only the action of urging the clutch 4 inward in the radial direction is sufficient, it is also possible to use rubber with an open cell structure. Further, in the illustrated embodiments, a synthetic resin such as silicone may be used instead of the closed foam rubber or the open foam rubber. This elastic spacer can be manufactured by pouring molten rubber or silicone into the space of the engagement portion where the end portion 4E of the clutch 4 engages with the pipe joint body 1. After the poured rubber or silicone is cured, the cured rubber or silicone is taken out to produce the elastic spacer 15. If the rubber or silicone poured into the space of the engagement part hardens, it will act as the elastic spacer 15, so it is also possible to fill it as it is as the elastic spacer 15 without removing it. It is necessary to consider the composition and characteristics of the rubber or silicone to be poured while taking into consideration the conditions described above regarding the dimensions A to C (FIG. 6) of the elastic spacer 15.

It should be noted that the illustrated embodiments are merely examples, and are not intended to limit the technical scope of the present invention.

EXPLANATION OF REFERENCE NUMBERS 1 pipe fitting body
1A flow path inside pipe fitting
1D annular recess
1H valve seat
2 rod
2A valve body
3 elastic member
4 clutch
4E dispenser side end of clutch
5 lever
7W drainage channel
10, 10-1, 10-2 filling nozzles
12 clutch mechanism
14 spring (elastic body)
15 elastic spacer
20 receptacle (vehicle filling port)

The invention claimed is:

1. A filling nozzle comprising:
a pipe joint body provided at a tip of a filling hose for filling gaseous fuel and detachably connectable to a receptacle on a side to be filled with gaseous fuel;
a clutch that extends on an outside of the pipe joint body in a connection direction defined by the direction in which the pipe joint body and the receptacle are connected and engages with the receptacle;
a lever that extends on an outside of the clutch in the connection direction and restricts a movement of the clutch in the connection direction when the gaseous fuel is filled; and
a biasing body spaced from the lever and interposed between the lever and the clutch or between the pipe joint body and the clutch, said biasing body urging the clutch inward in a direction perpendicular to the connection direction to release the restriction in movement of the clutch in the connection direction when filling of the gaseous fuel is completed.

2. The filling nozzle as claimed in claim 1, wherein said biasing body is an elastic body disposed between the lever and the clutch.

3. The filling nozzle as claimed in claim 1, wherein said biasing body is a ring-shaped elastic spacer disposed at an engaging portion where an end, remote from the receptacle, of the clutch engages with the pipe joint body, and a shape of said elastic spacer is complementary to a region of the engaging portion inward in a direction perpendicular to the connection direction.

4. The filling nozzle as claimed in claim 1, wherein an annular recess for accommodating the end, remote from the receptacle, of the clutch is formed in the pipe joint body, and a drainage channel is provided for communicating the annular recess with an outside of the pipe joint body.

5. The filling nozzle as claimed in claim 2, wherein said biasing body is a ring-shaped elastic spacer disposed at an engaging portion where an end, remote from the receptacle, of the clutch engages with the pipe joint body, and a shape of said elastic spacer is complementary to a region of the engaging portion inward in a direction perpendicular to the connection direction.

6. The filling nozzle as claimed in claim 2, wherein an annular recess for accommodating the end, remote from the receptacle, of the clutch is formed in the pipe joint body, and a drainage channel is provided for communicating the annular recess with an outside of the pipe joint body.

7. The filling nozzle as claimed in claim 3, wherein an annular recess for accommodating the end, remote from the receptacle, of the clutch is formed in the pipe joint body, and a drainage channel is provided for communicating the annular recess with an outside of the pipe joint body.

8. The filling nozzle as claimed in claim 1, wherein the biasing body is configured to move in concert with the clutch.

9. The filling nozzle as claimed in claim 1, wherein the biasing body is configured to apply an inwardly biasing force on the clutch when the pipe joint body is disconnected from the receptacle.

* * * * *